Patented May 14, 1940

2,200,282

UNITED STATES PATENT OFFICE 2,200,282

VAPOR PHASE CATALYTIC HYDROGENATION OF ADIPONITRILE

Wilbur A. Lazier, Wilmington, Del., assignor to E. I. du Pont de Nemours & Company, Wilmington, Del., a corporation of Delaware No Drawing. Application March 17, 1938, Serial No. 196,369

6 Claims. (Cl. 260—239)

This invention relates to a catalytic process, and more particularly it relates to a catalytic process for the hydrogenation of adiponitrile.

Catalytic hydrogenation processes have been used for many years in the preparation of a wide variety of useful products from both naturally occurring and synthetic raw materials. In general such contact processes have proved to be more economical and efficient than competitive processes involving the use of chemical reducing agents such as metallic sodium, zinc dust, and iron powder. Numerous references in the literature to the hydrogenation of simple olefinic or aromatic compounds have indicated that hydrogenation reactions may be carried out in the vapor phase as well as in the liquid phase without greatly affecting either the course of the reaction or yield and distribution of products. Accordingly it might be expected that other more complex compounds capable of hydrogenation, such as esters, acids, nitriles, and amides, would behave similarly. Among this group of derivatives the nitriles are of especial interest owing to the ease with which they undergo hydrogenation in the liquid phase to valuable amines. For example, in copending application Serial No. 127,203, filed February 23, 1937, there is described a process for the liquid phase hydrogenation of adiponitrile. The reaction is carried out under superatmospheric pressures in the presence of an excess of dry ammonia with an efficient hydrogenation catalyst such as nickel. Under these conditions adiponitrile is converted to hexamethylene diamine in yields of 90% or better, and only small amounts of hexamethylene imine and high boiling polymeric products are recovered. It has now been found that contrary to the behavior that might be expected, the hydrogenation of adiponitrile in the vapor phase follows an entirely different course, especially as regards the relative proportions of the products obtained. No process for the vapor phase hydrogenation of adiponitrile is known to have been described in the literature prior to the present invention.

Accordingly, this invention has as an object to provide a process suitable for the catalytic hydrogenation of adiponitrile in the vapor phase. A further object is to provide a continuous vapor phase process whereby adiponitrile is hydrogenated smoothly to hexamethylene imine, hexamethylene diamine and other products that are separated readily by vacuum fractional distillation. Still another object is to prepare hexamethylene imine in good yields by the continuous vapor phase hydrogenation of adiponitrile. Other objects will appear hereinafter.

These objects are accomplished by means of the following invention, which comprises catalytically hydrogenating adiponitrile in the vapor phase in the presence of an excess of ammonia and hydrogen. More specifically this reaction is carried out by passing vaporized adiponitrile mixed with a substantial excess of ammonia and hydrogen over an efficient hydrogenation catalyst at elevated temperatures in the range from about 150° C. to about 350° C. and under pressures varying from substantially atmospheric pressure up to about 250 atmospheres. The hydrogenation catalyst is employed preferably in the form of briquettes or pellets of uniform size, and the gas stream is passed at such a rate that the reactants remain in contact with the catalyst for a sufficient but not excessive length of time. A complete and detailed description of this process is contained in the following examples, which illustrate but do not limit the invention.

Example I

A gaseous mixture containing 3.5 parts by volume of ammonia and 5.25 parts by volume of hydrogen is passed through a vertically mounted reaction tube at the rate of 8.75 moles per hour. The contact time is 2.2 seconds. In traversing the tube, the gases pass through a preheating section consisting of 300 cc. of 8–14 mesh fused quartz, which is maintained at 350° C., and a catalyst bed comprising 200 cc. of reduced nickel-on-kieselguhr pellets heated to 180° C. Liquid adiponitrile is introduced into the reaction tube at the rate of about 20 g. per hour from a suitable feeding device. The nitrile is rapidly vaporized in the preheating section and swept over the catalyst. A mildly exothermic reaction occurs with the absorption of substantial amounts of hydrogen. The gaseous products issuing from the tube are condensed in a suitable receiver. From 230 g. of adiponitrile processed during 10.7 hours there is obtained 156 g. of liquid condensate. Fractional distillation of the crude product gives 18 g. of a water-hexamethylene imine binary, B. P. 93° to 96° C., 96.9 g. of hexamethylene imine, B. P. 135° to 138° C., and 24.2 g. of higher boiling mixed products of indefinite composition. The yield of hexamethylene imine is approximately 50% of theory.

Example II

Two hundred and forty grams of adiponitrile is passed with hydrogen and ammonia over a nickel-on-alumina catalyst under the conditions described in Example I. There is obtained 163.7 g. of liquid condensate together with some non-condensible gaseous products. Fractional distillation of the liquid yields the following hydrogenation products: (1) hexamethylene imine-water binary, B. P. 93° to 96° C., 46.6 g.; (2) hexamethylene imine, B. P. 135° to 138° C., 40.9 g.; and (3) high boiling fractions, 54.7 g. The fraction B. P. 130° C./27 mm. apparently is the incompletely hydrogenated product epsilon-amino capronitrile.

Example III

Fifty cc. of briquetted nickel-on-alumina catalyst is charged into a high pressure reaction tube and heated to a temperature of 155° C. A mixture containing 19 parts by volume of hydrogen and 7 parts by volume of ammonia is passed over the catalyst at the rate of 26 moles per hour under a pressure of 78 atmospheres. Vaporized adiponitrile is passed with the ammonia and hydrogen at the rate of 100 g. per hour. Under these conditions the contact time is approximately 14.8 seconds. From 192 g. of adiponitrile there is obtained a small yield of gaseous products together with 164 g. of liquid condensate. Fractional distillation of the liquid yields 8.5 g. of hexamethylene imine, 9 g. of hexamethylene diamine and 146.5 g. of high boiling products.

Example IV

Adiponitrile is vaporized and passed at the rate of 47.5 g. per hour over 50 cc. of briquetted nickel-on-alumina catalyst heated to 266° C. Hydrogen and ammonia are passed with the adiponitrile vapor at the rate of 17 and 1.79 moles per hour, respectively. The process is operated continuously under a pressure of 2600 lbs. per square inch. From 119 g. of adiponitrile processed during 2.5 hours there is obtained 65 grams of crude mixed amines, which on fractional distillation give 30 g. of hexamethylene imine, B. P. 135° to 138° C., 8 g. of hexamethylene diamine, B. P. 105° C./27 mm., and 25.8 g. of high boiling material containing polymeric amines and incompletely hydrogenated adiponitrile.

Example V

A gaseous mixture under 200 atmospheres pressure containing 10.3 parts by volume of adiponitrile vapor, 84 parts by volume of ammonia, and 102 parts by volume of hydrogen is passed at the rate of 8.75 moles per hour over 35 cc. of briquetted nickel-cadmium-chromite catalyst heated to a temperature of 335° C. Under these conditions the contact time is 58 seconds, and the adiponitrile is converted to a mixture of amines. From 148.3 g. of adiponitrile hydrogenated over a period of three hours there is obtained 108 g. of liquid product that on fractional distillation yields 63.7 g. of hexamethylene imine, 6.5 g. of hexamethylene diamine, and 29.1 g. of high boiling products. The molecular conversion to hexamethylene imine is approximately 47% of theory.

Although the foregoing examples describe the use of certain definite conditions of temperature, pressure, concentrations of reactants, contact times, and the like, it is to be understood that these values may be varied somewhat within the scope of the invention. Broadly speaking, the process of this invention may be carried out at temperatures ranging from about 150° C. to 350° C. under pressures varying from about one atmosphere to 250 atmospheres. However, all of the variable conditions of operation are so closely related and interdependent that if one is selected the others become automatically fixed within certain definite limits. This arises from the fact that the hydrogenation reaction is carried out in the vapor phase and for economical operation a practicable space-time yield of product must be obtained. At temperatures below the boiling point of adiponitrile, that is about 295°, or at higher temperatures under superatmospheric pressures, a sufficient excess of hydrogen and ammonia must be passed with the nitrile so that the partial pressure of the nitrile in the gaseous mixture is less than the vapor pressure of the nitrile at the given temperature. If this practice is not followed the catalyst may become wet with liquid, which often times leads to fouling and loss of catalytic activity. Moreover, it is obviously uneconomical to operate at a temperature so low that an excessive quantity of the hydrogen-ammonia mixture must be passed to maintain the nitrile in the gas phase.

In the above examples I have mentioned the term "time of contact" among the variable conditions of operation. The contact time and another related variable, "space velocity," are important values in connection with any vapor phase contact process and serve to express the rate at which the gaseous reactants traverse the zone of reaction. By "space velocity" is meant the number of volumes of gaseous reactants, calculated as at standard temperature and pressure, that traverse a unit volume of the catalytic material during one hour. A numerical value for space velocity is obtained from the formula $$S=\frac{V'}{V}$$

where S = space velocity, V' = volume of gaseous reactants and V = catalyst volume. The contact time, which is closely related to the space velocity and is likewise dependent on the temperature and pressure, is defined as the time in seconds required for the gaseous reactants to traverse the entire volume of the catalyst, assuming that no change in volume occurs. The contact time is calculated from the expression:

$$t=\frac{60\times 60\times 273\times P}{S\times(273+T)}$$

Under atmospheric pressures it is convenient to operate the process of this invention at a contact time of approximately two seconds. Under superatmospheric pressures the contact time may be increased to from 10 seconds to about 60 seconds. The space velocity varies accordingly under specific conditions of temperature and pressure.

As mentioned above, it is important to pass a sufficient quantity of an ammonia-hydrogen mixture with the adiponitrile in order to maintain the nitrile in the gas phase. Ordinarily the relative proportions of ammonia and hydrogen in the mixture are not very critical provided a molecular ammonia-nitrile ratio of at least 5 to 1 is maintained. However, it is usually convenient to use ammonia-hydrogen mixtures containing from 10 to 50 parts by volume of ammonia per 100 parts by volume of the gas mixture. At standard conditions the volume ratio of ammonia-hydrogen mixture to nitrile vapor may vary between 10 and 70 volumes to 1. The gas mixture may be recycled in the process after enriching with sufficient hydrogen to make up for that absorbed in the reaction.

In the practice of this invention there may be employed as catalysts the hydrogenating metals of groups 1, 2 and 8 of the Periodic Table, either alone, in admixture, or combined with a difficultly reducible oxide of a metal of the 6th group. For example, nickel or cobalt and nickel-cadmium chromite are especially effective. These catalytic materials are preferably used in a finely divided form and may be deposited on a porous support such as pumice, kieselguhr, alumina gel, and silica gel. Catalyst powders are conveniently prepared for use in the process by compressing into pellets or briquettes of suitable size. Stabilized catalysts containing a substantial proportion of oxide, catalysts comprising the carbonate, oxide or hydroxide of the hydrogenating metal deposited on an inert porous support, and catalysts in which the hydrogenating metal is combined with a non-reducible oxide are preferably reduced in a stream of hydrogen-containing gas prior to exposure to the reaction gases.

In treating adiponitrile according to the process of this invention the major product of the hydrogenation reaction is hexamethylene imine. Hexamethylene diamine and higher polymeric amines may also be formed. Moreover, under certain conditions, especially at high temperatures, the hexamethylene imine of the invention may undergo rearrangement to form other amines such as α-picoline, α-pipecoline, and α-ethyl-pyrrolidine. It is therefore obvious to one skilled in the art that the present invention offers an effective means of producing valuable amines. Hexamethylene imine and its rearrangement products are particularly useful in preparing rubber compounding chemicals and are also of potential value in preparing insecticides, synthetic waxes, plasticizers for cellulosic materials, and the like. Hexamethylene diamine is of interest as a resin intermediate.

It is apparent that many widely different embodiments of this invention may be made without departing from the spirit and scope thereof and therefore it is not intended to be limited except as indicated in the appended claims.

I claim:

1. The process which comprises catalytically hydrogenating adiponitrile in the vapor phase in the presence of an excess of ammonia and of hydrogen.

2. The process which comprises catalytically hydrogenating adiponitrile in the vapor phase in the presence of an excess of ammonia and of hydrogen at a temperature between 150° C. and 350° C.

3. A process which comprises bringing adiponitrile, hydrogen, and ammonia into contact with a hydrogenation catalyst, at a temperature between 150° C. and 350° C., the time of contact between said mixture of gases and catalyst being between 2 and 60 seconds.

4. The process in accordance with claim 3 characterized in that the hydrogenation catalyst comprises as an essential component a hydrogenating metal of Groups 1, 2 and 8 of the Periodic Table.

5. The process in accordance with claim 3 characterized in that the hydrogenation catalyst is a nickel catalyst.

6. The process which comprises bringing adiponitrile with an excess of ammonia and hydrogen preheated to a temperature of about 350° C., into contact with a nickel hydrogenation catalyst heated to a temperature of about 180° C., said reaction being carried out in the vapor phase.

WILBUR A. LAZIER.